(12) United States Patent
Aoki

(10) Patent No.: US 6,791,699 B2
(45) Date of Patent: Sep. 14, 2004

(54) OPTICAL DISPLACEMENT-MEASURING APPARATUS

(75) Inventor: Toshihiko Aoki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 366 days.

(21) Appl. No.: 09/921,584

(22) Filed: Aug. 6, 2001

(65) Prior Publication Data
US 2002/0018220 A1 Feb. 14, 2002

(30) Foreign Application Priority Data
Aug. 7, 2000 (JP) ........................................ 2000-238683

(51) Int. Cl.⁷ .............................................. G01B 11/14
(52) U.S. Cl. ...................... 356/616; 250/237 G; 33/707
(58) Field of Search .................... 356/616; 250/237 G; 33/1 M, 707

(56) References Cited

U.S. PATENT DOCUMENTS

| | | | |
|---|---|---|---|
| 4,319,134 A | | 3/1982 | Weber |
| 4,339,198 A | * | 7/1982 | Leuchter, Jr. ................ 356/144 |
| 4,409,479 A | * | 10/1983 | Sprague et al. .......... 250/237 G |
| 4,926,566 A | | 5/1990 | McMurtry et al. |
| 5,774,219 A | | 6/1998 | Matsuura |
| 5,889,280 A | * | 3/1999 | Matsuura ................. 250/237 G |

FOREIGN PATENT DOCUMENTS

| | | |
|---|---|---|
| EP | 1 106 972 A1 | 6/2001 |
| GB | 932481 | 7/1963 |
| GB | 2 034 880 A | 6/1980 |
| JP | U 05-008427 | 2/1993 |
| JP | A 06-034376 | 2/1994 |
| JP | A 7-243870 | 9/1995 |

* cited by examiner

*Primary Examiner*—Richard A. Rosenberger
(74) *Attorney, Agent, or Firm*—Oliff & Berridge, PLC

(57) ABSTRACT

An optical displacement-measuring apparatus has a scale on which optical gratings are formed along a first axis and a second axis. It also has a sensor head arranged opposite to the scale and relatively movable along the first and second axes. The sensor head includes a photosensitive unit (3) for optically detecting a relative movement to provide a displacement signal. The photosensitive unit (3) includes a transparent substrate (30). A photosensitive device array (PDAy) is formed with a semiconductor film deposited on the substrate (30) and arrayed along the first axis at a certain pitch for providing a displacement signal corresponding to a displacement along the first axis. A photosensitive device array (PDAx) is formed with a semiconductor film deposited on the photosensitive device array (PDAy) sandwiching an insulator layer therebetween and arrayed along the second axis at a certain pitch for providing a displacement signal corresponding to a displacement along the second axis.

18 Claims, 8 Drawing Sheets

LIGHT FROM SCALE

OPTICAL DISPLACEMENT-MEASURING APPARATUS

CROSS REFERENCE TO RELATED APPLICATIONS

This application is based on and claims the benefit of priority from prior Japanese Patent Application No. 2000-238683, filed Aug. 7, 2000, the entire contents of which are incorporated herein by reference.

BACKGROUND OF THE INVENTION

1. Field of the Invention

The present invention relates to an optical displacement-measuring apparatus.

2. Description of the Related Art

The use of an x-y scale has been known in the art to optically detect a two-axial displacement along x- and y-axes. A sensor head for reading the displacement of the x-y scale includes two photosensitive devices mounted thereon to provide displacement signals along x- and y-axes When two photosensitive devices are mounted on a substrate, the x-y squareness depends on the installation accuracy. Therefore, it is difficult to achieve a high precise x-y squareness. In addition, since the two photosensitive devices are mounted at individual locations on the substrate, the sensor head can not be downsized. In general, the substrate for use in mounting the photosensitive devices thereon employs a rigid, flat substrate such as a glass substrate. The x-y scale has a scale surface that is not always flat but often spherical and cylindrical. Accordingly, a structure that mounts the photosensitive devices on a rigid substrate can not be applied flexibly to x-y scales that have various scale surfaces.

SUMMARY OF THE INVENTION

The present invention has been made in consideration of the above situation and accordingly has an object to provide an optical displacement-measuring apparatus that includes photosensitive device arrays integrated at an excellent squareness for detecting two-axial displacements.

The present invention has another object to provide an optical displacement-measuring apparatus with a sensor head that includes photosensitive device arrays integrated small for detecting two-axial displacements.

The present invention has a further object to provide an optical displacement-measuring apparatus with a sensor head that can be flexibly applied to various scale surfaces.

The present invention provides an optical displacement-measuring apparatus having a scale on which optical gratings formed along a first axis and a second axis, and a sensor head arranged opposite to said scale and relatively movable along said first and second axes. The sensor head has a photosensitive unit for optically detecting a relative movement to provide a displacement signal. The photosensitive unit has a substrate, and a first and second photosensitive device arrays formed with a first semiconductor film deposited on said substrate and arrayed along said first and second axes at a certain pitch for providing displacement signals corresponding to the displacement along said first and second axes, respectively.

The apparatus also has a scale on which optical gratings formed along a first axis and a second axis crossing the first axis, and a sensor head arranged opposite to the scale and relatively movable along the first and second axes. The sensor head includes a photosensitive unit for optically detecting a relative movement to provide a displacement signal. The photosensitive unit has a substrate, a first photosensitive device array formed with a first semiconductor film deposited on the substrate and arrayed along the first axis at a certain pitch for providing a displacement signal corresponding to a displacement along the first axis, an insulator layer covering the first photosensitive device array, and a second photosensitive device array formed with a second semiconductor film deposited on the insulator layer and arrayed along the second axis at a certain pitch for providing a displacement signal corresponding to a displacement along the second axis.

According to the present invention, the photosensitive unit for measuring two-axial displacements is configured as a structure of two photosensitive device arrays formed through deposition of and lithography to semiconductor films. Therefore, the two-axial photosensitive device arrays have an excellent squareness, resulting in a small, high-performance, optical displacement-measuring apparatus.

In the present invention, the substrate of the photosensitive unit may be made of a transparent substrate having a front surface on which the first and second photosensitive arrays are formed and the reverse surface serving as light incident surface. The substrate may be made of a flexible resinous substrate, thereby flexibly corresponding to scale surfaces having two-dimensional optical gratings even if the surfaces are curved.

The present invention also provides an optical displacement-measuring apparatus, which has a scale having optical gratings formed thereon. The apparatus also has a sensor head arranged opposite and relatively movable to the scale. The sensor head includes a photosensitive unit for optically detecting a relative movement to provide a displacement signal. The photosensitive unit has a substrate, and a photosensitive device array formed with a semiconductor film deposited on the substrate and patterned. At least one of the scale and the photosensitive unit is formed using a flexible resinous substrate.

According to the present invention, at least one of the scale and the photosensitive unit is formed with a flexible resinous substrate, thereby flexibly responding to any cases where the scale has one- or two-dimensional optical gratings and the scale surface is cylindrical, spherical or free curved.

Specifically in the present invention, the photosensitive device array preferably includes a flexible resinous substrate, and a plurality of photosensitive devices formed with a semiconductor film deposited on the flexible resinous substrate for providing displacement signals with different phases.

When the scale has two-dimensional optical gratings, the photosensitive unit may include first and second photosensitive device arrays formed at different locations on the substrate corresponding to the two-dimensional optical gratings. Alternatively, the photosensitive unit may include first and second photosensitive device arrays stacked at the same location on the substrate sandwiching an insulator layer therebetween corresponding to the two-dimensional optical agratings.

In the present invention, an electroluminescence device may be used as a surface luminous light source in the sensor head for illuminating the scale.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Figure 1:
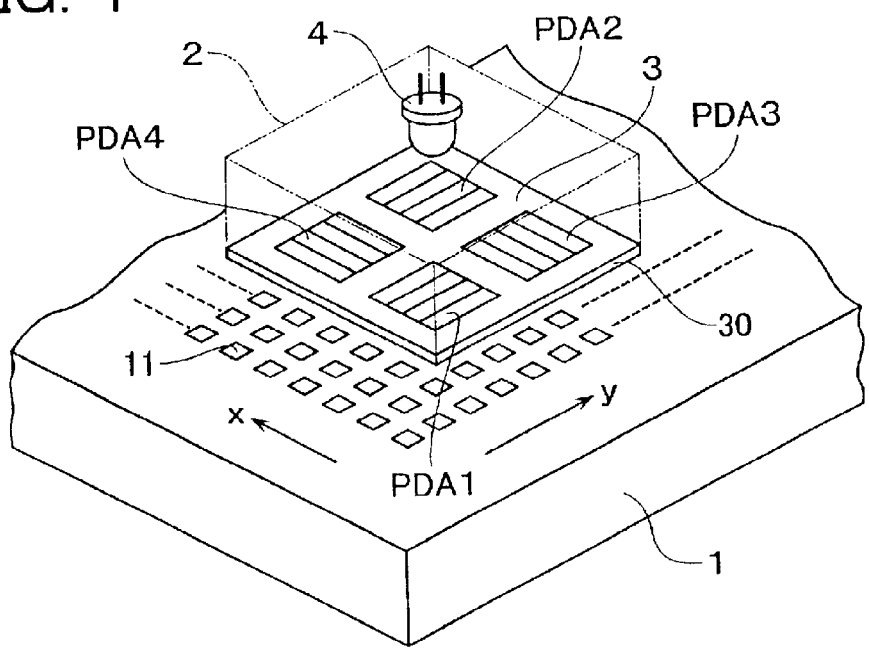
FIG. 1 is a perspective view showing a fundamental arrangement of an optical displacement-measuring apparatus according to the present invention.

FIG. 1 is a perspective view showing a fundamental arrangement of an optical encoder according to the present invention. A scale 1 is of x-y type having two-dimensional optical gratings 11 formed in two-orthogonal axial directions along x- and y-axes. A sensor head 2 is located opposite to the scale 1 and relatively movable in the two-axial directions. The sensor head 2 includes a photosensitive unit 3 for optically detecting relative movements in the two-axial directions to provide a displacement signal of each axis and a light source 4 such as an LED for illuminating the scale 1. As the light source 4, surface luminous device, such as electroluminescence (EL) device or surface luminous LED, may be preferably used.

The photosensitive unit 3 includes photodiode arrays PDA1 and PDA2 for detecting displacements along x-axis and photodiode arrays PDA3 and PDA4 for detecting displacements along y-axis. Specifically, in the photodiode array PDA1, for example, photodiodes (PD) for A-phase output and for B-phase output are arrayed at a certain pitch. B-phase has a phase difference of 90° from A-phase. In the photodiode array PDA2, photodiodes (PD) for AB-phase output and for BB-phase output are arrayed at a certain pitch. AB- and BB-phase outputs respectively have opposite phases of A- and B-phase outputs. Similarly, in the photodiode array PDA3, photodiodes (PD) for A-phase and B-phase outputs are arrayed, and in the photodiode array PDA4, photodiodes (PD) for AB-phase and BB-phase outputs are arrayed.

Alternatively, Photodiodes that output A- , B- , AB- and BB-phase signals may be arranged in each photodiode array. In this case, using only two photodiode arrays with two axes, the sensor head for a two-dimensional encoder can be obtained. As shown in FIG. 1, when four photodiode arrays PDA1 to PDA4 which output 4-phase displacement signals, respectively, are arranged, high signal intensity can be obtained by composing the same phase signals output from each photodiode array.

Figure 2:
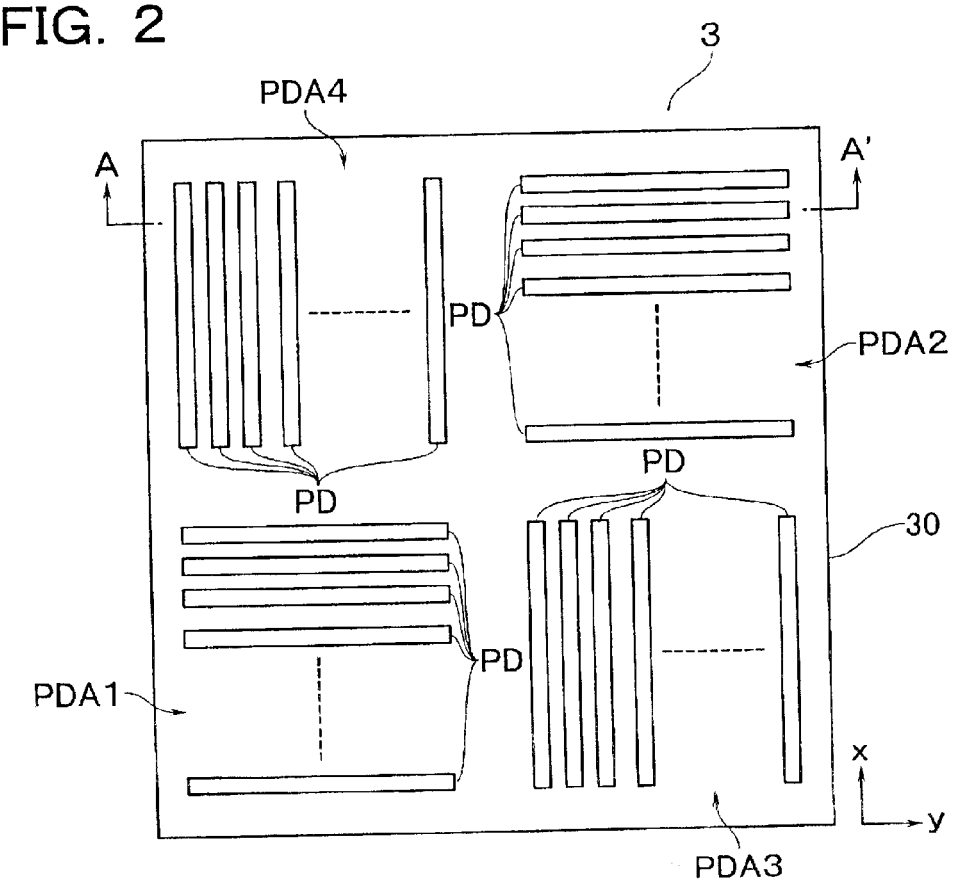
FIG. 2 is a plan view showing an arrangement of a sensor head.
Figure 3:
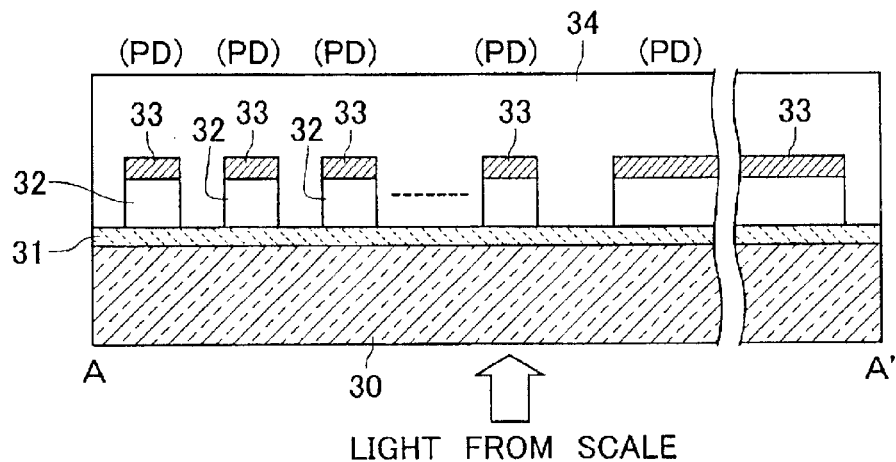
FIG. 3 is a cross-sectional view taken along A–A' in FIG. 2.

Including these two-axial photodiode arrays PDA1–PDA4, the photosensitive unit 3 is formed integrally by patterning an amorphous semiconductor film deposited on a substrate 30. FIG. 2 shows a layout of the photosensitive unit 3 and FIG. 3 shows a cross-sectional structure taken along A–A' in FIG. 2. The substrate 30 is a transparent substrate and its rear surface in this example serves as a light incident surface, to which a light reflected from the scale enters.

A transparent electrode 31 is formed on the upper surface of the substrate 30 as a common electrode for each photodiode PD. An amorphous semiconductor film 32 is deposited on the transparent substrate 31 and patterned to form arrays PDA3 and PDA4 of stripe-shaped photodiodes PD elongated along x-axis and simultaneously arrays PDA1 and PDA2 of stripe-shaped photodiodes PD elongated along y-axis.

The semiconductor film 32 has a specific structure of p-i-n or p-n layers. A terminal electrode 33 is formed on the upper surface of each photodiode PD. The terminal electrode 33 is deposited subsequent to and patterned together with the semiconductor film 32. Each photodiode PD is covered with an insulator layer 34 such as a silicon oxide.

As in this embodiment, the common amorphous semiconductor film 32 is patterned to form the photodiode arrays PDA1, PDA2 and PDA3, PDA4 for detecting two-axial displacements of the x-y scale 1. Therefore, the squareness between the two-axial photodiode arrays can be determined in the lithography process to be excellent more than that when those arrays are produced individually and attached to the substrate. In addition, the photosensitive unit 3 can be downsized totally.

The sensor head 2 with the configuration of FIGS. 1–3 can measure not only straight displacements along x- and y-axes, but also a relative rotational angular displacement θ between the sensor head 2 and the scale 1 in the x-y plane when displacement signals from the four photodiode-arrays PDA1–PDA4 are processed.

In the configuration of FIGS. 1–3, the amorphous semiconductor film 32 employs typically silicon and alternatively others such as ZnSe and CdSe, which are similarly employed in the following embodiments.

Figure 4:
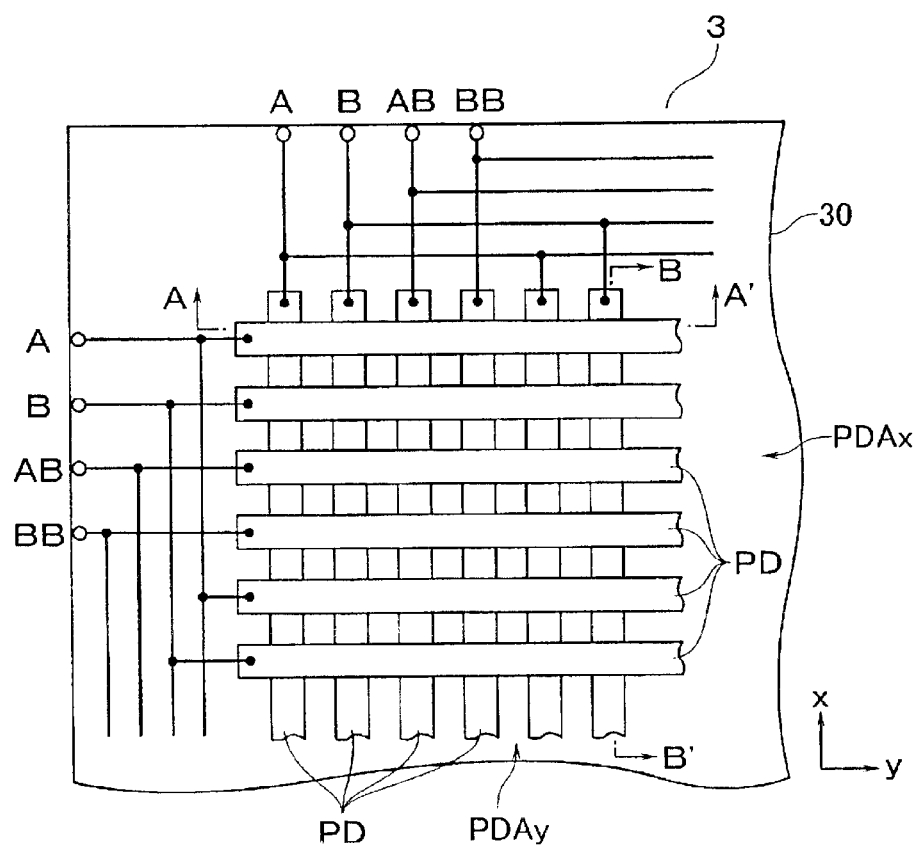
FIG. 4 is a plan view showing another arrangement of a sensor head.
Figure 5:
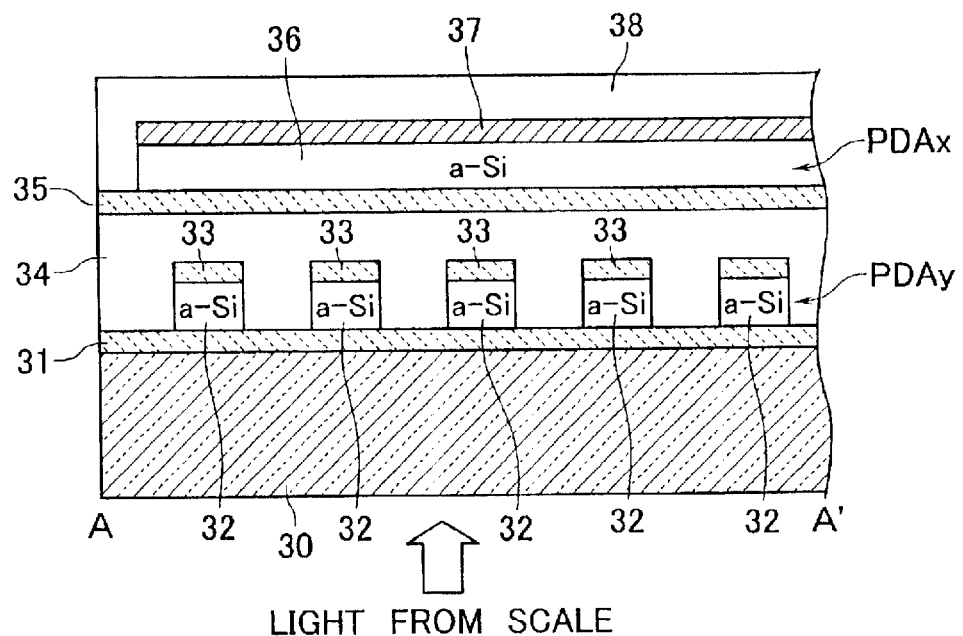
FIG. 5 is a cross-sectional view taken along A–A' in FIG. 4.
Figure 6:
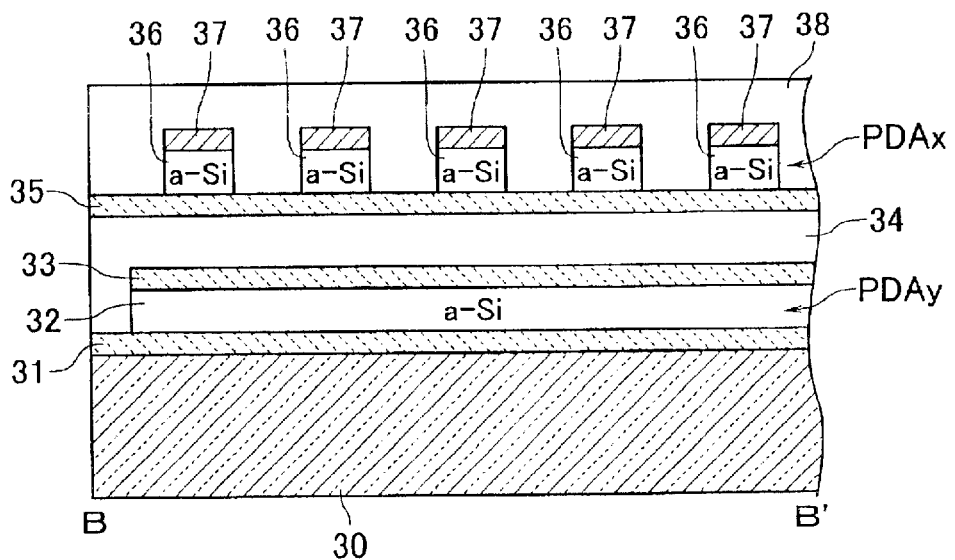
FIG. 6 is a cross-sectional view taken along B–B' in FIG. 4.

On the basis of the configuration of FIGS. 1–3, two-axial photodiode arrays can be formed in a laminated structure and an embodiment of which will be described next. FIG. 4 shows a layout of such a photosensitive unit 3, and FIGS. 5 and 6 are cross-sectional views taken along A–A' and B–B' in FIG. 4. A photodiode array PDAy for detecting a displacement along y-axis and a photodiode array PDAx for detecting a displacement along x-axis are formed using different amorphous semiconductor films 32 and 36, respectively.

On a transparent substrate 30, a transparent electrode 31 is formed as a common electrode for the photodiode array PDAy. The amorphous semiconductor film 32 in a first layer is deposited on the transparent electrode 31 and patterned to form the photodiode array PDAy.

Each terminal electrode of the photodiode array PDAy is formed of a transparent electrode. The photodiode array PDAy is covered with an interlayer insulator 34 such as a silicon oxide. A transparent electrode 35 is formed on the interlayer insulator 34 as a common electrode for the photodiode array PDAX. The amorphous semiconductor film 36 in a second layer is deposited on the transparent electrode 35 and patterned to form the photodiode array PDAx. Each terminal electrode 37 for the photodiode array PDAX may employ a metallic electrode. Further, the photodiode array PDAx is covered with an insulator layer 38.

A terminal electrode 33 for the photodiode array PDAy may also be formed of a metallic electrode. In this case, a light incident from the rear surface of the substrate is interrupted to enter the photodiode array PDAX partly by the terminal electrode 33. However, adjustment of an area ratio between the photodiode arrays PDAX and PDAY allows substantially equivalent amounts of lights to enter both arrays with no problems. Other than or together with the area ratio, output gains of the photodiode arrays PDAX and PDAy can be adjusted to deal with this matter.

Such lamination of the photodiode arrays for detecting two-axial displacements can further miniaturize the photosensitive unit 3. In addition, the photodiode arrays can be produced by film deposition and lithography technology to have an excellent, x-y, two-axial squareness. In the lower photodiode array PDAy, both of the upper and lower electrodes are formed of transparent electrodes. Accordingly, when a light enters into the rear surface of the substrate 30, a part of the light is photoelectrically converted at the photodiode array PDAy and the rest penetrates the substrate up to the upper photodiode array PDAX. Thus, the photodiode arrays PDAy and PDAX both can obtain displacement signals with sufficient S/N ratios.

The transparent substrate 30 in the above two embodiments may be formed using a rigid material, for example, a glass substrate, though preferably it may employ a flexible resinous substrate. The flexible resinous substrate may include a polyimide resin. Thus, widely applicable optical encoders can be achieved. Such applications will be described below.

Figure 7:
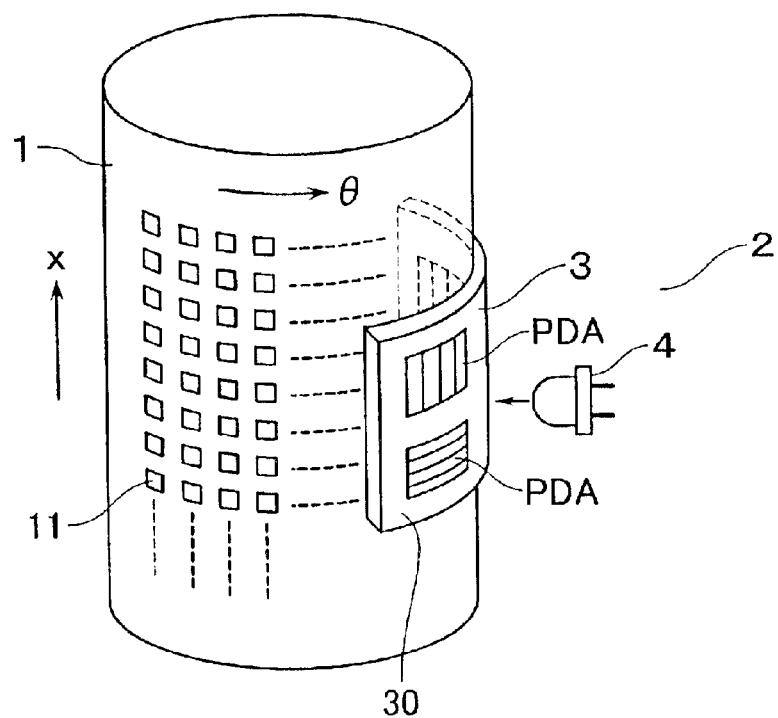
FIG. 7 is a perspective view showing an arrangement of a displacement-measuring apparatus applied to a cylindrical scale.

FIG. 7 shows an example of the scale 1 that is a cylindrical scale. This cylindrical scale 1 has an outer surface, on which two-axial optical gratings are formed in the cylindrical axis direction(x-axis) and in the circumference direction (θ) of the cylinder. For such cylindrical scale 1, the substrate 30 in the photosensitive unit 3 is a flexible resinous substrate, on which photodiode arrays PDAs are formed for detecting displacements in the directions of x-axis and θ.

The photosensitive unit 3 has the same photodiode array configuration as that in FIGS. 1–3 or that in FIGS. 4–6 except for the material of the substrate. Process steps include the use of film deposition and lithography technologies executed when the substrate 30 is still flat. If the substrate 30 is formed using a flexible resinous substrate, the photosensitive unit 3 may be bent corresponding to a diameter of the cylindrical scale 1 as shown in FIG. 7 to oppose to and apart a certain gap from the outer surface of the cylindrical scale 1.

When the photosensitive unit 3 is bent, its pitch in the θ-direction slightly deviates from the pitch in the photodiode array PDA patterned on a plane. This pitch deviation can be neglected, however, if the diameter of the cylindrical scale 1 is larger to some extent. Alternatively, a pattern pitch on a plane can be determined with allowance of curvature because the pitch deviation can be estimated from a diameter of the curvature.

As described above, the use of the flexible resinous substrate provides the photosensitive device array with a wider application range in practice.

Figure 8:
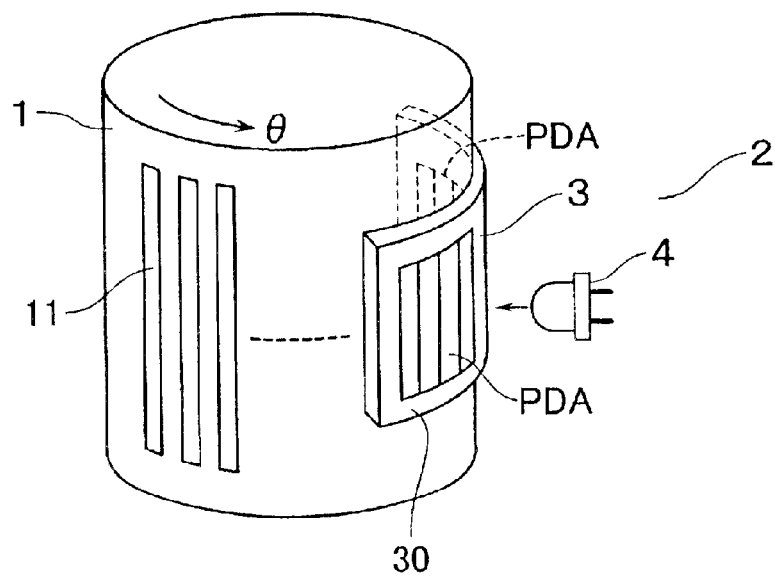
FIG. 8 is a perspective view showing another arrangement of a displacement-measuring apparatus applied to a cylindrical scale.

FIG. 8 shows another example of the scale 1 that is also a cylindrical scale but is directed to perform only one-axial measurement in the circumferential direction (θ) That is, the scale 1 has optical gratings 11 formed on the outer surface at a certain pitch in the direction θ. In this case, the photosensitive unit 3 has photodiode arrays PDA that are arranged in the direction θ only. Also in this case, the use of a flexible resinous substrate for the substrate 30, similar to the case in FIG. 7, provides possible flexible applications.

Figure 9:
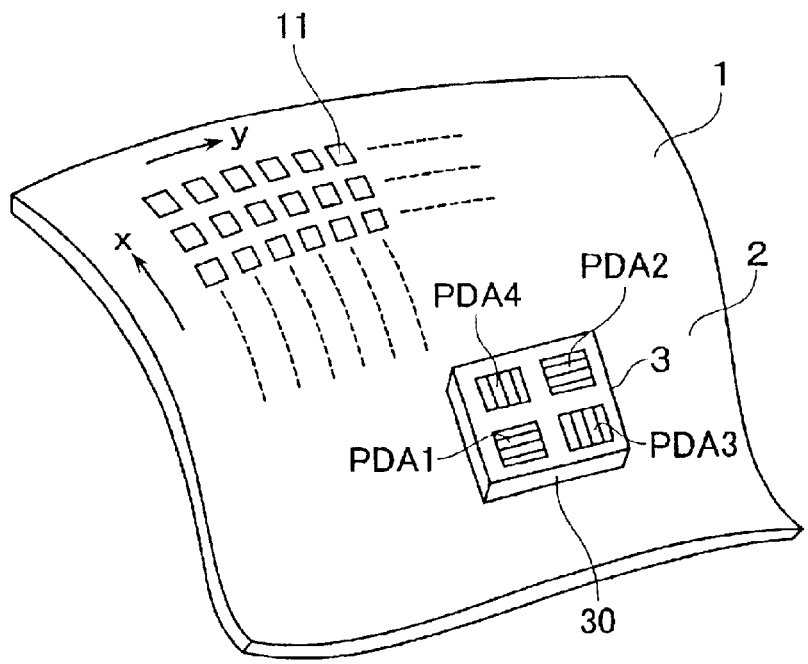
FIG. 9 is a perspective view showing an arrangement of a displacement-measuring apparatus applied to a free curved scale.

FIG. 9 shows an example of the scale 1 that is a free curved scale. The free curved scale 1 has a free curved surface, on which two-axial optical gratings are formed in the directions of x-axis and y-axis. For this scale, the substrate 30 in the photosensitive unit 3 is formed using a flexible resinous substrate, on which photodiode arrays PDAs are formed for detecting displacements in the directions of x-axis and y-axis. The photosensitive unit 3 has the same photodiode array configuration as that in FIGS. 1–3 or that in FIGS. 4–6 except for the material of the substrate. When the photosensitive unit 3 deforms after the free curved scale 1, opposite to and apart a certain gap from the outer surface of the scale 1, the straight displacements in x-y axes directions and rotational displacement θ can be measured.

In the arrangement of FIG. 9, the scale 1 may be formed using a flexible resinous substrate while the substrate 30 in the photosensitive unit 3 may be formed rigid. In this case, the scale 1 is stuck onto an object having a free curved surface to form the free curved scale 1. For such the scale 1, the sensor head 2 is movable relative to the scale 1 and spacing apart a certain gap therefrom.

Also in the examples of FIGS. 7 and 8, the optical gratings on the scale 1 may be formed using a flexible resinous substrate, which is then stuck onto the cylindrical surface.

Both of the scale 1 and the substrate 30 in the photosensitive unit 3 may be formed using flexible resinous substrates. When the photosensitive unit 3 employs a flexible resinous substrate, it can employ a surface luminous device such as a flexibly deformable organic or inorganic EL device for the light source, which is stuck on the substrate.

Figure 10:
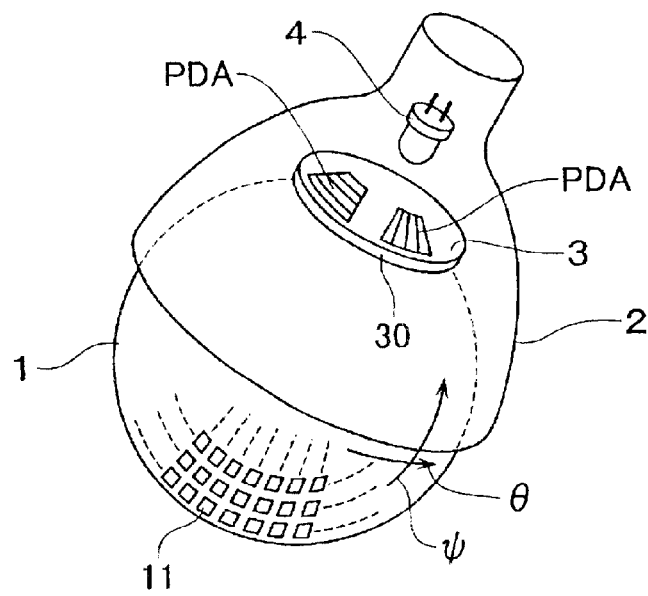
FIG. 10 is a perspective view showing an arrangement of a displacement-measuring apparatus applied to a spherical scale.

FIG. 10 shows an example of the scale 1 that is a spherical scale. This scale 1 has optical gratings 11 formed on its spherical surface in two circumferential directions, θ and ψ, that are normal to each other. The sensor head 2 is mounted on the scale 1 like a cap is worn. The substrate 30 in the photosensitive unit 3 is formed using a flexible resinous substrate, on which photodiode arrays PDAs are formed for detecting displacements in the directions θ and ψ. The substrate 30 is located opposite to the spherical surface of the scale 1. The photosensitive unit 3 has the same photodiode array configuration as that in FIGS. 1–3 or that in FIGS. 4–6 except for the material of the substrate.

As obvious from the above, the photosensitive unit 3 is applicable to the spherical scale when the substrate is formed of a flexible resinous substrate.

Several embodied arrangements of the sensor head 2 in an optical displacement-measuring apparatus according to the present invention will be exemplified below.

Figure 11:
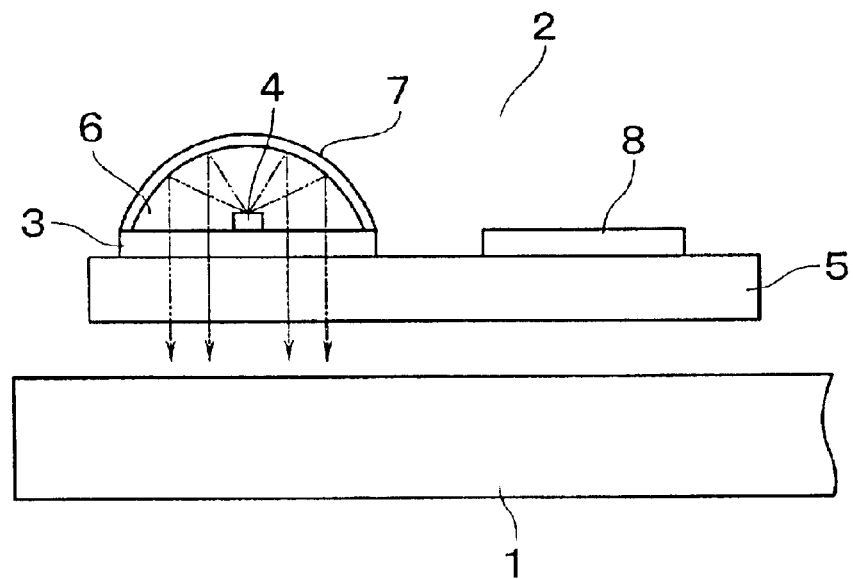
FIG. 11 shows a specific arrangement of a sensor head.

The sensor head 2 in FIG. 11 has a transparent substrate 5 and a photosensitive unit 3 mounted thereon. A light source 4, mounted on the photosensitive unit 3, is an LED chip, of which upper surface is the luminous surface. This LED-mounted portion is molded in a convex, transparent resin 6. A reflective film 7 is coated over the convex surface of the transparent resin 6. Thus, a light from the LED is reflected at the convex surface and converted into a substantially collimated light, which is illuminated through the transparent substrate 5 to the scale 1. In this case, the light from the light source is illuminated to the scale 1 through regions that have no photosensitive devices formed therein. Optical gratings can be formed in the above regions that have no photosensitive devices, thereby configuring a 3-grating system. The 3-grating system may also be configured if first optical gratings are provided beneath the photosensitive unit 3 and the light from the light source is illuminated to the scale through the photosensitive unit 3 and the first optical gratings.

In the embodiment of FIG. 11, a signal processor 8 is also mounted on the transparent substrate 5 to process the output signal from the photosensitive unit 3.

Figure 12:
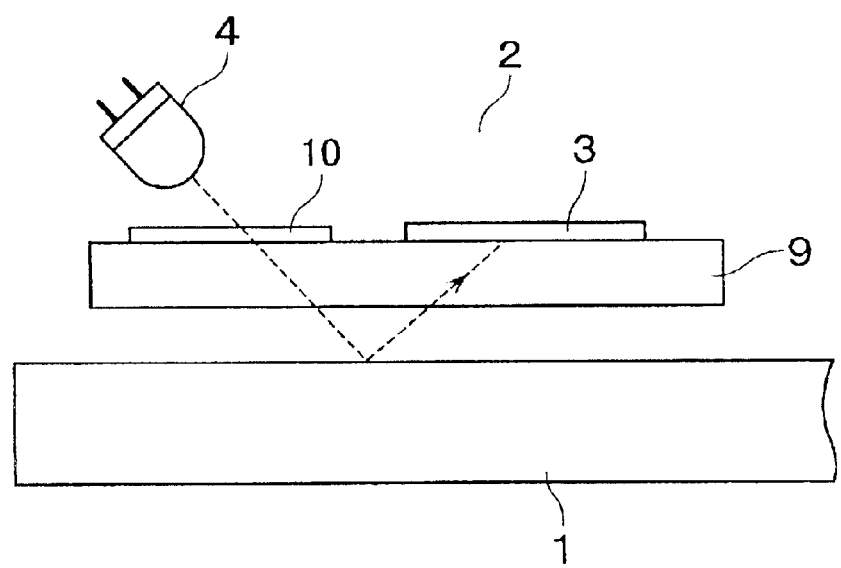
FIG. 12 shows a further arrangement of a sensor head.

FIG. 12 shows an arrangement of an optical encoder with a 3-grating system. The sensor head 2 in this embodiment has an index substrate 9 formed of a transparent substrate, and index gratings 10 formed thereon at the light source side. A light from the light source 4 is illuminated to the scale 1 through the index gratings 10. The photosensitive unit 3 is mounted on the index substrate 9 apart from the index gratings 10.

Figure 13:
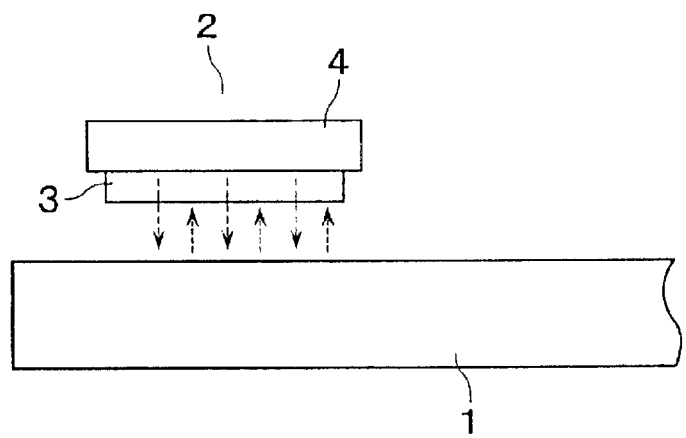
FIG. 13 shows a yet further arrangement of a sensor head.

FIG. 13 shows an example of the sensor head 2 that employs a surface luminous EL device or LED as the light source 4. The surface luminous light source is located so as to direct its luminous surface to the scale 1. The photosensitive unit 3 is mounted on the luminous surface. The light from the LED 4 is illuminated almost normal to the scale 1 through the photosensitive unit 3 and the light reflected almost normal from the scale 1 is detected by the photosensitive unit 3. As the EL device, an organic or inorganic EL device can be used. The luminous surface of the light source 4 is not necessary to contact to the photosensitive unit 3.

Figure 14:
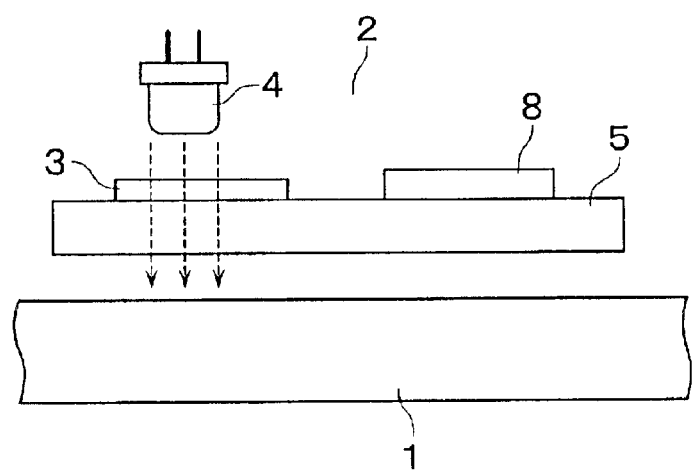
FIG. 14 shows an alternative of the arrangement in FIG. 11.

FIG. 14 shows an alternative of the arrangement in FIG. 11. The light source is simply configured by arranging an LED 4. The light from the LED 4 is introduced almost normal to the photosensitive unit 3 that also serves as first and third gratings, and illuminated to the scale 1 through the photosensitive unit 3.

Figure 15:
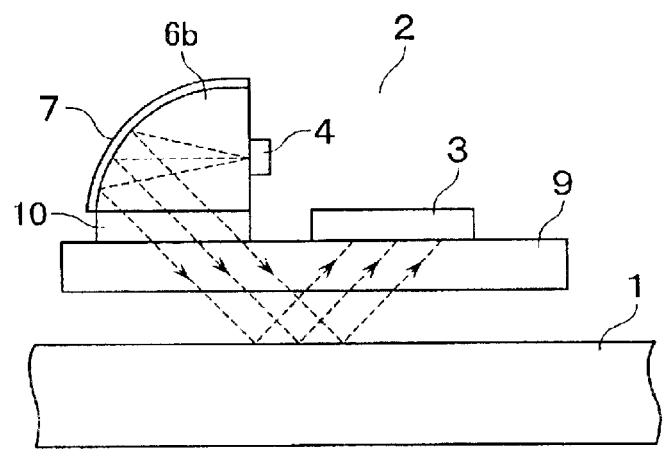
FIG. 15 shows an alternative of the arrangement in FIG. 12.

FIG. 15 shows an alternative of the arrangement in FIG. 12. A concave mirror has a transparent resinous body 6b substantially in the form of a quarter sphere and a reflective film 7 formed on its spherical surface. The LED 4, arranging the luminous surface vertically, is attached to the transparent resinous body 6b on a side that is perpendicular to the surface of the scale 1. The light reflected at the reflective film 7 obliquely enters the index gratings 10 and illuminates the scale 1. The 3-grating system, which employs index gratings (or pinhole array) at the light source side with the same pitch as the scale gratings, has an advantage of optical 2-split (that is, an output signal pitch is a half that of a 2-grating system). The index gratings (or pinhole array) 10 at the light source side are not always required and can be omitted in the arrangements in FIGS. 12 and 15, for example.

Figure 16A:
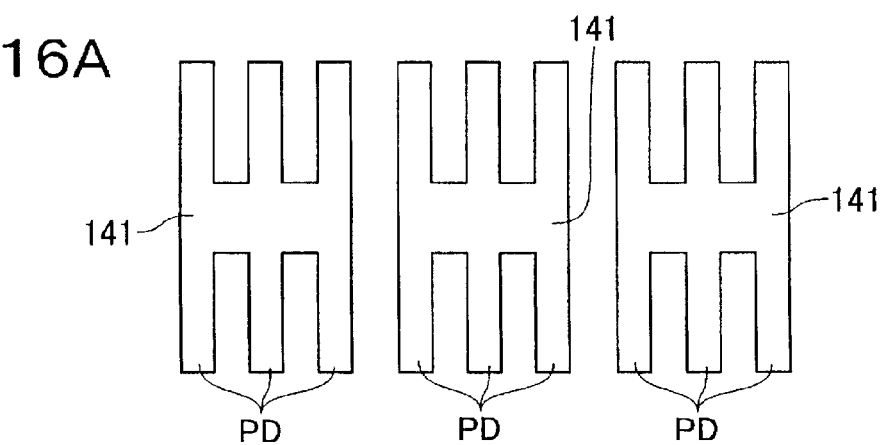
FIGS. 16A–C show other layouts of photosensitive device arrays.
Figure 16B:
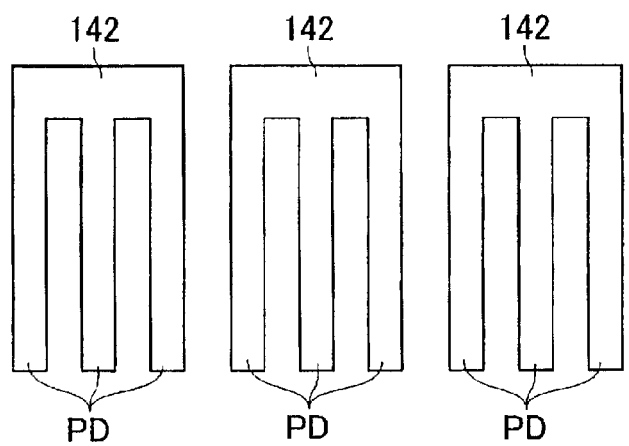
Figure 16C:
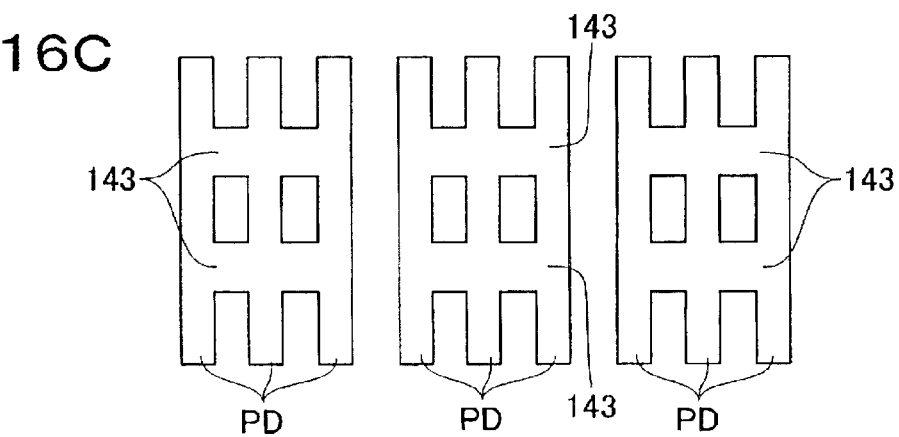

In the above examples, each photodiode PD in the photosensitive unit 3 is formed to have an elongated rectangular pattern. The photodiode PD may have other patterns with a bundle of plural photodiodes in phase as shown in FIGS. 16A–16C. In FIG. 16A, the plural photodiodes PDs have links 141 formed at their central portions as contacts for terminal wires. In FIG. 16B, the plural photodiodes PDs have links 142 at one of their end portions. In FIG. 16C, the plural photodiodes PDs have plural links 143.

As obvious from the forgoing, according to the present invention, there is provided a small optical displacement-measuring apparatus that includes photosensitive device arrays integrated at an excellent squareness for detecting two-axial displacements. Also according to the present invention, there is provided an optical displacement-measuring apparatus with a sensor head that can be flexibly applied to various scale surfaces.

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An optical displacement-measuring apparatus, comprising a scale on which optical gratings formed along a first axis and a second axis crossing said first axis, and a sensor head arranged opposite to said scale and relatively movable along said first and second axes, said sensor head including a photosensitive unit for optically detecting a relative movement to provide a displacement signal, wherein said photosensitive unit comprises:

a substrate; and a first to fourth photosensitive device arrays formed with a semiconductor film deposited on said substrate and arranged along said first and second axes, said first and second photosensitive device arrays are arrayed along the first axis at a certain pitch to provide displacement signals corresponding to a displacement along said firstaxis, said third and fourth photosensitive device arrays are arrayed along the second axis at a certain pitch to provide displacement signals corresponding to a displacement along said second axis, said first and second photosensitive device arrays and said third and fourth photosensitive device arrays are diagonally arranged, respectively.

2. The optical displacement-measuring apparatus according to claim 1, wherein said substrate comprises a transparent substrate having a front surface on which said first and second photosensitive arrays are formed and the reverse surface serving as a light incident surface.

3. The optical displacement-measuring apparatus according to claim 2, wherein said substrate comprises a flexible resinous substrate.

4. The optical displacement-measuring apparatus according to claim 1, wherein said sensor head has an electroluminescence device serving as a light source that illuminates said scale.

5. An optical displacement-measuring apparatus, comprising a scale on which optical gratings formed along a first axis and a second axis crossing said first axis, and a sensor head arranged opposite to said scale and relatively movable along said first and second axes, said sensor head including a photosensitive unit for optically detecting a relative movement to provide a displacement signal, wherein said photosensitive unit comprises:

a substrate;

a first photosensitive device array formed with a first semiconductor film deposited on said substrate and arrayed along said fist axis at a certain pitch for providing a displacement signal corresponding to a displacement along said first axis; an insulator layer covering said first photosensitive device array; and a second photosensitive device array formed with a second semiconductor film deposited on said insulator layer and arrayed along said second axis at a certain pitch for providing a displacement signal corresponding to a displacement along said second axis.

6. The optical displacement-measuring apparatus according to claim 5, wherein said substrate comprises transparent substrate having a front surface on which said first and second photosensitive arrays are stacked and the reverse surface serving as a light incident surface.

7. The optical displacement-measuring apparatus according to claim 6, wherein said substrate comprises a flexible resinous substrate.

8. The optical displacement-measuring apparatus according to claim 5, wherein said sensor head has an electroluminescence device serving as a light source that illuminates said scale.

9. An optical displacement-measuring apparatus, comprising a scale on which optical gratings are formed, and a sensor head arranged opposite and relatively movable to said scale, said sensor head including a photosensitive unit for optically detecting a relative movement to provide a displacement signal, said photosensitive unit including a substrate, and a photosensitive device array formed with a semiconductor film deposited on said substrate and patterned, wherein said photosensitive unit comprises:

a flexible resinous substrate; and a photosensitive device array comprising a plurality of photosensitive devices formed with a semiconductor film deposited on said flexible resinous substrate to provide displacement signals with different phases.

10. The optical displacement-measuring apparatus according to claim 9, wherein said scale is a flat scale having one-dimensional optical gratings formed thereon.

11. The optical displacement-measuring apparatus according to claim 9, wherein said scale is a flat scale having two-dimensional optical gratings formed thereon.

12. The optical displacement-measuring apparatus according to claim 9, wherein said scale is a cylindrical scale having one-dimensional optical gratings formed thereon.

13. The optical displacement-measuring apparatus according to claim 9, wherein said scale is a cylindrical scale having two-dimensional optical gratings formed thereon.

14. The optical displacement-measuring apparatus according to claim 9, wherein said scale is a spherical scale having two-dimensional optical gratings formed thereon.

15. The optical displacement-measuring apparatus according to claim 9, wherein said scale is a free curved scale having two-dimensional optical gratings formed thereon.

16. The optical displacement-measuring apparatus according to claim 9, wherein said scale has two-dimensional optical gratings and said photosensitive unit including first and second photosensitive device arrays formed at different locations on said substrate corresponding to said two-dimensional optical gratings.

17. The optical displacement-measuring apparatus according to claim 9, wherein said sensor head ham an electroluminescence device serving as a light source that illuminates said scale.

18. An optical displacement-measuring apparatus, comprising a scale on which optical gratings are formed, and a sensor head arranged opposite and relatively movable to said scale, said sensor head including a photosensitive unit for optically detecting a relative movement to provide a displacement signal, said photosensitive unit including a substrate, and a photosensitive device array formed with a semiconductor film deposited on said substrate and patterned, wherein at least one of said scale and said photosensitive unit is formed using a flexible resinous substrate, said scale has two-dimensional optical gratings and said photosensitive unit including first and second photosensitive device arrays stacked at the same location on said substrate sandwiching an insulator layer therebetween corresponding to said two-dimensional optical gratings.

* * * * *